United States Patent [19]

Sanders

[11] Patent Number: 4,685,052
[45] Date of Patent: Aug. 4, 1987

[54] PULSE TRAIN PRESENCE DETECTOR
[75] Inventor: Walter J. Sanders, Jeannette, Pa.
[73] Assignee: American Standard Inc., Wilmerding, Pa.
[21] Appl. No.: 702,530
[22] Filed: Feb. 19, 1985
[51] Int. Cl.$^4$ ............................................. G06F 11/30
[52] U.S. Cl. .................................. 364/426; 364/424; 371/16
[58] Field of Search ............... 364/424, 426, 550, 551, 364/431.11; 371/16, 62; 340/52 F

[56] References Cited

U.S. PATENT DOCUMENTS

| | | | |
|---|---|---|---|
| 4,107,253 | 8/1978 | Borg et al. | 371/16 |
| 4,386,427 | 5/1983 | Hosaka | 371/16 |
| 4,541,050 | 9/1985 | Honda et al. | 371/16 |
| 4,580,220 | 4/1986 | Braun et al. | 364/431.11 |
| 4,584,645 | 4/1986 | Kosak | 364/431.11 |
| 4,600,987 | 7/1986 | Nambudiri | 371/62 |

Primary Examiner—Gary Chin
Attorney, Agent, or Firm—G. E. Hawranko

[57] ABSTRACT

A pulse train presence detector for a system having a number of interruptible devices, consists of a pulse generator, interface device which receives a periodic trigger signal and outputs a pulse train signal in response thereto, the pulse train signal is communicated to an NPN transistor and operates the transistor to alternating "on" and "off" states. A first current path is established during the transistor "off" state through which a first current flows and charges a first capacitor. A second current path branches off from the first current path, wherein a second current flows when the transistor is "on". A forward-biased diode in the first current path and an adjacent reverse-biased diode in the second current path block cross-flowing of currents between the respective paths. A second capacitor in the second current path is charged when the transistor is "on". The current in the second path flows as a result of the charged first capacitor in the first current path, this second current serving to energize relay and to charge the second capacitor. When the transistor is turned "off", the second capacitor discharges to energize the relay. The charging and discharging times in this alternating manner is selected to coincide with the pulse train segments. A too long high or low segment prevents the charging of the second capacitor or discharging of the first capacitor.

12 Claims, 2 Drawing Figures

PULSE TRAIN PRESENCE DETECTOR

BACKGROUND OF THE INVENTION

This invention relates to a pulse train presence detector, as can be particularly utilized in a braking system for a transit vehicle having a microprocessor controlling the braking operation. Such microprocessor-control arrangements have found wide-spread acceptance in many fields today, including the field of transit vehicle braking systems which, because of the need to shield the riding public from harm, requires the highest degree of safety considerations. It is a required condition of such braking systems that, in the event of a failure of the microprocessor-control arrangement, in either the hardware or software segments, the braking units are activated to effect stoppage of the vehicle. In some known applications of microprocessor-control systems, particularly in the field of transit or rail-type vehicles, one way of checking the safe operation of the microprocessor is to use the clock pulse, which provides the necessary timing to the microprocessor, to maintain a power-up circuit, the absence of which shuts the microprocessor down. The problem with such an operation is that the clock pulse is not an accurate indication of the working condition of the hardware and software segments of the microprocessor, and, as such, an accuracy problem arises. Additionally, merely shutting down the microprocessor does not always result in the shutdown to a more restrictive or desirable condition of the system it is controlling, namely, a braking system in this situation. Still other microprocessor applications in this area have used multiple, parallel microprocessors with voting arrangements to verify the integrity of the microprocessor control arrangement. Inherently disadvantageous in this approach, is the increased cost due to the increased number of components required.

SUMMARY OF THE INVENTION

It is, therefore, an object of the invention to provide a pulse train presence detector for monitoring the operation of the hardware and software segments of the microprocessor-control arrangement, and initiating a braking application upon detection of a failed condition in such microprocessor-control arrangement.

It is a further object of the invention to provide such a pulse train presence detector utilizing a minimum number of components.

It is yet a further object of the invention to provide such a pulse train presence detector whereby the failure of any component in the pulse train presence detector circuit results in a more restrictive braking application.

Briefly, the invention consists of an electronic logic unit which, in this case, is shown as a microprocessor programmed to operate a vehicle braking system utilizing such criteria as vehicle speed, weight, wheel traction, torque, and braking signals. The microprocessor includes an operation whereby a trigger pulse is output during specific operating program occurrences. The trigger pulse initiates a pulse train signal being output from a pulse generator. Such pulse train signal having "high" and "low" segments, such as, for example, the peaks and troughs when the waveform is a sinusoidal or square wave, or other waveforms having respective cyclical "high" and "low" portions. This pulse train is then coupled to the base electrode of an NPN transistor. The collector electrode of the transistor has connected thereto a resistor and a capacitor timing arrangement. The capacitor is charged when the input pulse train is at a low condition, thereby shutting the transistor "off" and establishing a current path through the resistor and capacitor to ground. This charged first capacitor is then used to energize a vital relay by discharging through a second current path once the transistor is activated to an "on" condition as a result of a high portion of the pulse train being input thereto. This second current path connects the first capacitor to ground and includes the relay, a second diode, the first capacitor, and the collector-to-emitter junction of the transistor. As the first capacitor is discharging and holding the relay up, a second capacitor connected across the relay, is being charged such that, as the pulse train again goes low, thus reestablishing the first current path, the second capacitor can now serve to hold the relay in the "up" position. The second capacitor's timing constant is established in conjunction with the resistive value of the coil of the vital relay and that constant, together with the first timing constant established by the first resistor and capacitor arrangement, are chosen to coincide with the frequency of the pulse train. At least one set of normally open or "front" contacts of the relay is used to close a circuit which controls application of the force motor associated with the brake actuator, and indicates the status of the pulse train as well. Other segments of the brake system could be interrupted by the operation of the contacts as well; for instance, a magnet valve or emergency valve could be affected. A steady high or low input to the transistor results in an interruption of the charging/discharging cycle of the respective first and second capacitors, therefore, dropping the relay and opening the indication/control circuit.

DESCRIPTION AND OPERATION

Figure 1:
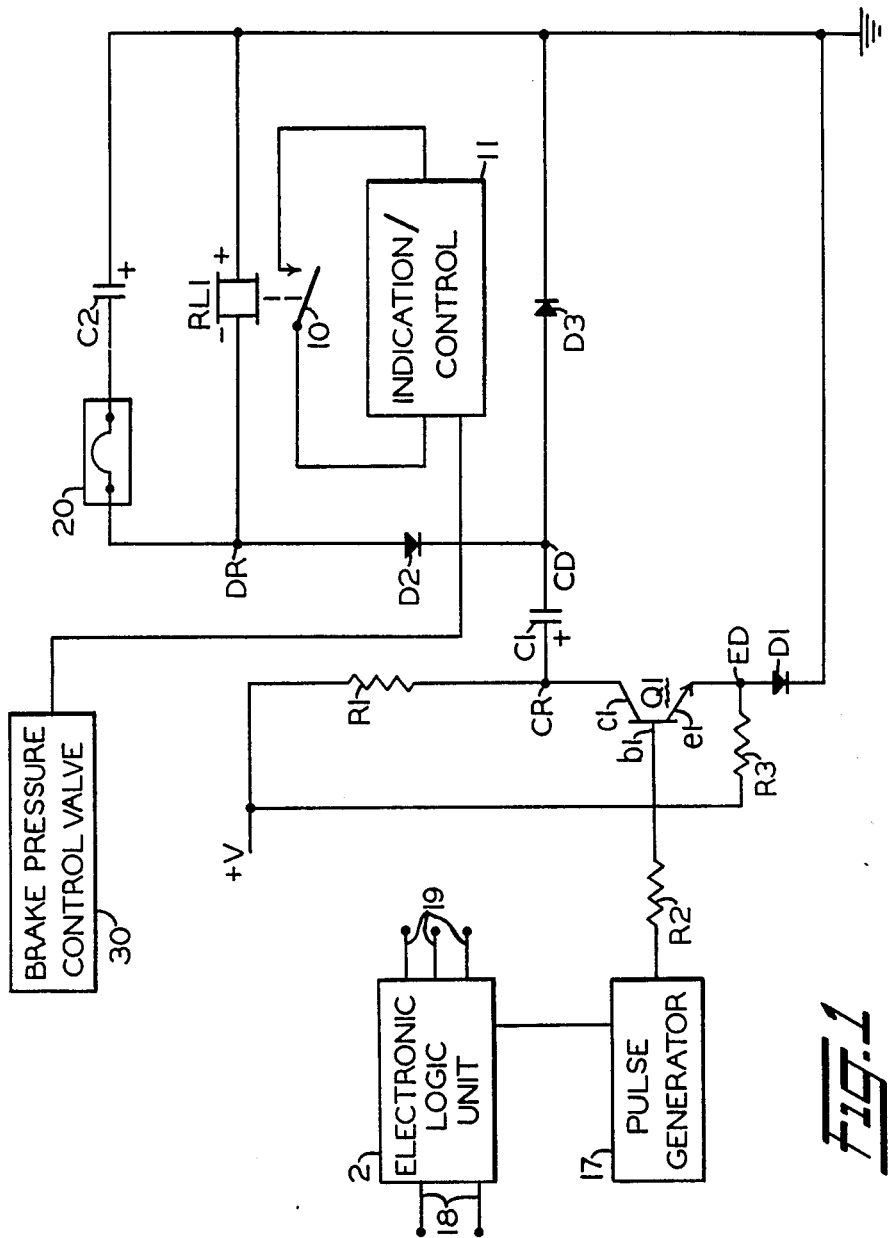
FIG. 1 is a schematic diagram of a pulse train presence detector, constructed in accordance with the invention.
Figure 2:
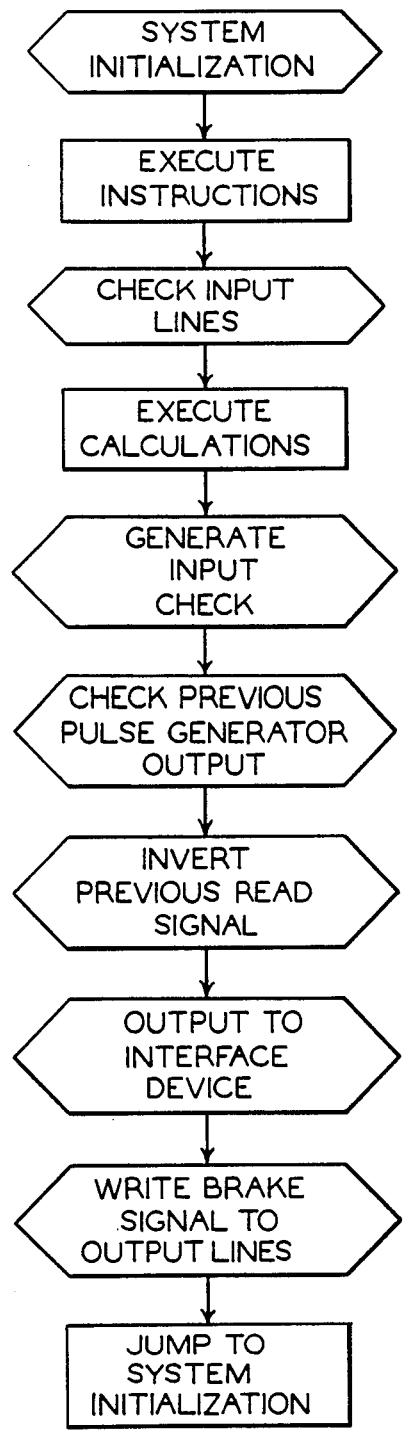
FIG. 2 is a diagrammatic view in flow-chart form of the operation of generating a pulse train according to the invention.

As seen in FIG. 1, a pulse train presence detector for use with a microprocessor-controlled braking arrangement includes a pulse generator 17 activated into cyclically alternating high and low states upon introduction of a trigger pulse input thereto. Such a trigger pulse can occur in the form of periodic high-input signals generated by an electronic logic unit 2 which, in this instance, is a microprocessor, but can be satisfied by an arrangement of discrete logic components as well. The trigger pulse is generated at a specific, predetermined frequency by the electronic logic unit 2 as a function of specific operations steps performed by the electronic logic unit 2. Such operating steps are shown in FIG. 2, in the form of a logic flow chart. It can be appreciated that the frequency and timing of the trigger pulse can be varied over a range of values and still perform the desired monitoring or "watch dog" function which, in the event of a failure of any set of operating instructions or hardware components, results in the termination of the trigger pulse. Additionally, the specific operating steps after which the trigger pulse is generated can be modified; it is only important that the trigger pulse be an accurate indication that the program is executing the instructions in the proper prearranged manner.

As further seen in FIG. 1, the electronic logic unit 2, in addition to the trigger pulse output, also includes a plurality of input lines 18 and a plurality of output lines 19. The input lines 18 allow for communicating the necessary input data to the electronic logic unit 2 for processing and determining therefrom braking operations. Such input data includes, but is not limited to: vehicle speed, vehicle load, wheel traction, wheel troque, and braking force requested. The output lines 19 direct the necessary command functions to the braking equipment to effect the determined vehicle braking force.

The pulse generator 17 receives the trigger pulse and, as a consequence thereof, changes the output state at the generator output 20 to the opposite state as existed prior to receiving that specific trigger pulse. Such an operation can be performed by a flip-flop arranged such that the specific frequency trigger pulse results in an alternating arrangement of high and low state changes thus forming a pulse train having a frequency proportional to the trigger pulse.

Connected between the generator output 20 and the base electrode b1 of an NPN transistor Q1 is a bias resistor R2. The bias resistor R2 is of a value chosen to allow the flow of necessary base current to the base electrode b1 of the transistor Q1, which turns the transistor Q1 "on" when the pulse train is at a high state.

The emitter electrode e1 of transistor Q1 is connected to the anode electrode of diode D1 through a junction point ED; the cathode electrode of diode D1 is connected to ground. It should be noted that this diode serves to insure the shutting "off" of transistor Q1 when the trigger pulse is in the low state by providing a diode-valued drop between the emitter electrode e1 and ground, a zener diode or more than one diode in series could be substituted therefor The junction point ED between the emitter electrode e1 and the anode electrode of the diode D1 is connected to one lead of a resistor R3, which resistor R3 is connected to a positive-voltage source V+ at the other lead. Also connected to the voltage source is one lead of a timing resistor R1. The other lead of the timing resistor R1 is connected to the junction point CR. This junction point CR is coupled in one direction with the collector electrode c1 of transistor Q1, and in another direction with one plate of a first timing capacitor C1. The operation of charging and discharging the first timing capacitor C1 as a function of the state of the transistor Q1 will be described hereinafter in further detail.

The second plate of first timing capacitor C1 is connected to junction point CD. Coupled in one direction to junction point CD is the anode electrode of a third diode D3, the cathode electrode of diode D3 being connected to ground. Coupled in another direction from junction point CD is the cathode electrode of a second diode D2. The anode electrode of diode D2 is connected to junction point DR. The junction point DR has connected thereto the negative coil terminal of a vital relay RL1 in addition to one plate of a second timing capacitor C2. Disposed between junction point DR and the first plate of the second timing capacitor C2 is a jumper block 20, this block can merely serve to connect the junction point DR to timing capacitor C2 or a variable resistor (not shown) can be inserted therein to provide a means for tuning the resistance, capacitance value in this second current path. The second plate of the second timing capacitor C2 is coupled to the positive coil terminal of relay RL1, which is then connected to ground. Associated with the coil of relay RL1 is an inherent resistive value which, together with the capacitive value of the second timing capacitor C2, determines the associated charging and discharging times of C2. It should be pointed out at this time that, in order to maintain the integrity of the entire circuit, the relay RL1 must, itself, be a vital type relay.

As further seen in FIG. 1, a first set of contacts 10 of relay RL1 is shown as a normally-open set of contacts. The normally-open contacts 10 are shown to operate an indication, control element 11, which can include therein such features as the power circuit to the electronic logic unit 2, as well as a circuit to the force motor which controls the brake actuator, or other safety element associated with the braking system of a mass-transit type vehicle such as the brake pressure control valve 30. Other contacts of relay 1 can be used to control additional relays, as well as to indicate the status of the control functions previously described and the indication, control element 11.

In operation, the electronic logic unit 2 generates a trigger pulse upon specific operational occurrences as are illustrated in the flow chart of FIG. 2; which occurrences indicate proper operation of the electronic logic unit 2, such trigger pulses being coupled to the pulse generator 17. The pulse generator, upon receiving the trigger pulses, outputs at the generator output 20 a pulse train of a predetermined frequency. When the pulse train is presented to the base electrode b1 of the transistor Q1 in a high state, which allows current to flow to the base electrode b1, transistor Q1 is operated to an "on" state. During the low portion of a pulse train, no current can flow to the base electrode b1 of the transistor Q1 at which occurrence, the transistor Q1 is turned to an "off" state. When the transistor Q1 is turned "off", a first current path is established from the positive voltage source through the first timing resistor R1, through the junction point CR, the first timing capacitor C1, the junction point CD, diode D3, which is arranged such that current flows from the cathode connection of diode D3, to the ground connection. As the current flows in this first current path, the first timing capacitor C1 is charged such that, a predetermined first voltage is developed during a predetermined first time period determined by the resistive and capacitive values of the first timing resistor R1 and first timing capacitor C1. During the charging of the first timing capacitor C1, current is prevented from flowing to relay RL1 by the second diode D2. As the pulse train goes from the low to high state, thus turning "on" transistor Q1, the first plate of the timing capacitor C1 becomes connected to ground through the collector to emitter diode of the transistor Q1, and the first diode D1. At this time, the second current path established allows the discharging of the first timing capacitor C1 through the second diode D2 and the relay RL1, the current thus flowing in the second current path serving to hold the relay RL1 in the "up" or energized condition. During the discharging time of the first timing capacitor, this current flowing in the second current path also serves to charge the second timing capacitor C2 at a rate dictated by a second predetermined timing constant established by the capacitive value of the second timing capacitor C2, and the resistive value associated with the coil of the relay RL1.

When the pulse train again goes low, thus turning "off" the transistor Q1 and reestablishing the first current path from the voltage source through the first timing resistor R1, first timing capacitor C1 and first diode D1 to ground, the first timing capacitor C1 is again charged and the second current path is closed. The relay RL1, however, is still energized at this time, as a result of the second timing capacitor C2 now discharging through the relay RL1 to hold the relay in the "up" condition. In this manner, it can be appreciated that the relay RL1 is maintained in the energized position by the alternating charging and discharging operations of the respective first and second timing capacitors C1, C2, which alternating charging and discharging operation comes about as a result of turning "on" and turning "off" of the transistor Q1 by the pulse train.

In the event of a failure in the microprocessor or electronic logic unit 2, whether in the hardware or operating instruction segments, the trigger pulse will no longer be produced, thus terminating the pulse train output from the generator output 20. In this occurrence, the transistor Q1 will be turned "off" and the first current path will be established indefinitely. Under this situation, the second timing capacitor C2 can only maintain the relay RL1 in the energized state as long as the discharging current flows therethrough. However, this discharging current will run out absent the discharging current of the timing capacitor C1 flowing through the second current path.

Conversely, if the pulse train generator fails in the state whereby the pulse train is presented at a constant high level, thus turning the transistor Q1 "on" for an indefinite period of time, the second current path is established indefinitely and the first current path cannot be put into effect to charge the capacitor C1. In either the failed high or failed low state of the pulse train, the alternating charging and discharging operations of the respective first and second timing capacitors C1 and C2 cannot take effect, and the relay RL1 will drop out thereby causing the first set of contacts 10 to open, which effects a shutdown of the braking arrangement. It can be appreciated further that, due to the minimum number of electrical components and the interrelationship of those components through the first and second current paths, a failure of any one of the components will also result in the termination of the alternating charging and discharging timing operations.

The scheme for selecting the pulse train frequency and the first and second timing constant associated with the first timing resistor R1, first timing capacitor C1 arrangement and second timing capacitor C2, relay resistance arrangement are influenced by a consideration that a single instantaneous type failure, as can occur from a voltage spike, will be ignored and only a more lengthy failure will be recognized as being sufficient to eliminate the pulse train and effect a brake application.

Although the hereinabove-described embodiment of the invention constitutes a preferred form, it can be appreciated that modifications can be made thereto without departing from the scope of the invention, as detailed in the appended claims. An example of such a modification could be the substitution of a typical polar-biased relay in place of a vital relay RL1. Additionally, the pulse generator need not be provided by a separate element but can be operationally substituted therefor by a specialized output device associated with the microprocessor hardware.

I claim:

1. A pulse train presence detector for a microprocessor-controlled vehicle braking system having interruptible safety components, said pulse train presence detector comprising:
    (a) a pulse generator coupled to the microprocessor and receptive of an operating signal generated by the microprocessor upon substantially continuous microprocessor operation, said pulse generator outputting a pulse train of a predetermined frequency in response to such operating signal;
    (b) a transistor member having a base electrode coupled to said pulse generator such that, such pulse train, when in a high state, turns said transistor "on", and, when such pulse train is in a low state, turns said transistor "off";
    (c) a first current path connected to a collector electrode of said transistor, wherein a first current flows therethrough when said transistor is turned "off", said first current path including a first resistor and a forward-biased first diode;
    (d) a second current path connected to said first current path wherein a second current flows when said transistor is turned "on", said second current path including a reverse-biased second diode coupled adjacent said forward-biased first diode such that, said first current flowing in said first current path is prevented from flowing in said second current path and said second current flowing in said second current path is prevented from flowing in said first current path when said transistor is in said "off" state;
    (e) first storing means in said first current path for storing a current change at a predetermined first voltage, said first voltage being achieved following said first current flowing in said first current path for a predetermined first time period;
    (f) a relay member in said second current path and having a coil portion which is energized by said second current flowing in said second current path such that at least one set of relay contacts are operated thereby in conjunction with the interruptible safety components to detect the presence of said pulse train, said coil having a resistive value associated therewith; and
    (g) second storing means in said second current path for storing a current change at a predetermined second voltage, said second voltage being achieved following said second current flowing in said second current path for a predetermined second time period, said second current flowing as a function of said resistive value of said coil and said first voltage stored in said first storing means and introduced to said second current path when said transistor is turned "off", said second current continuing to flow in said second current path and said second current being a function of said second voltage and said resistive value of said coil when said transistor is turned "on".

2. A pulse train presence detector, as set forth in claim 1, wherein said first storing means includes a first timing capacitor in said first current path adjacent said first resistor and said collector electrode of said transistor.

3. A pulse train presence detector, as set forth in claim 1, wherein said second storing means includes a second timing capacitor in said second current path adjacent said coil portion of said relay.

4. A pulse train presence detector, as set forth in claim 1, wherein said first time period corresponds substantially to the duration of said low state of said pulse train.

5. A pulse train presence detector, as set forth in claim 1, wherein said second time, period corresponds substantially to the duration of said high state of said pulse train.

6. A pulse train presence detector, as set forth in claim 1, further comprising at least one forward-biased third diode serially connected between an emitter electrode of said transistor and ground.

7. A pulse train presence detector, as set forth in claim 3, wherein said second timing capacitor is in said second current path in parallel relation to said coil portion of said relay, said second storing means further including a variable resistor arranged in series with said second timing capacitor such that said predetermined second time period can be tuned thereby.

8. A pulse train presence detector, as set forth in claim 1, wherein a first set of said at least one set of contacts operates to an open condition in the absence of current flowing in said second current path such that at least one of the interruptible safety components is interrupted to affect a brake application.

9. A pulse train presence detector, as set forth in claim 1, wherein such first stored voltage is substantially equivalent in value to said second stored voltage.

10. A pulse train presence detector, as set forth in claim 1, wherein said pulse generator is an electronic interfacing device connected between an output of the microprocessor and said base electrode of said transistor, said electronic interfacing device outputting an inverted signal upon receiving a trigger pulse.

11. A method of detecting the presence of a pulse train indicative of microprocessor operation in controlling a vehicle brake system having interruptible safety components, said pulse train presence detecting method comprising:

(a) generating an operating signal from the microprocessor upon substantially continuous microprocessor operation;

(b) receiving said operating signal on a pulse generator and outputting a pulse train signal in response thereto;

(c) communicating said pulse train signal to a base electrode of a transistor such that a high portion of said pulse train signal activated the transistor to an "on" state and a low portion of said pulse train signal deactivates the transistor to an "off" state;

(d) establishing a first current path connected in part to a collector electrode of said transistor when said transistor is in the "off" state such that a first current flows therethrough;

(e) establishing a second current path connected in part to said first current path when said transistor is in the "on" state such that a second current flows therethrough;

(f) blocking flow of current from said first current path to said second current path when said transistor is in said "off" state and from said second current path to said first current path when said transistor is in the "on" state;

(g) charging a first storage member in said first current path to a predetermined first voltage when said transistor is in said "off" state;

(h) inducing said second current in said second current path when said transistor is in said "on" state as a function of said first stored voltage and the resistive value associated with a coil portion of a relay in said second current path;

(i) charging a second storage member in said second current path to a predetermined second voltage when said transistor is in the "on" state;

(j) maintaining the flow of said second current through said second current path when said transistor is in said "on" state as a function of said predetermined second voltage and said resistive value associated with said coil; and (k) energizing said coil of said relay such that at least one set of contacts is operated thereby.

12. A method of detecting the presence of a pulse train, as set forth in claim 11, further comprising adjusting the time associated with charging said second storage member by tuning an adjustable resistor member in said second current path.

* * * * *